Aug. 12, 1969  D. A. GALLANT  3,460,557
DEVICE FOR PRODUCING AND REGULATING A PULSATING
PNEUMATIC CONTROL SIGNAL
Filed Jan. 23, 1967  3 Sheets-Sheet 1

INVENTOR
DONALD A. GALLANT
BY
Channing L. Richards &
Dalbert U. Shefte
ATTORNEYS Aug. 12, 1969  D. A. GALLANT  3,460,557
DEVICE FOR PRODUCING AND REGULATING A PULSATING
PNEUMATIC CONTROL SIGNAL
Filed Jan. 23, 1967  3 Sheets-Sheet 2

INVENTOR
DONALD A. GALLANT
BY
Channing L. Richards &
Dalbert U. Shefte
ATTORNEYS

United States Patent Office 3,460,557
Patented Aug. 12, 1969

3,460,557
DEVICE FOR PRODUCING AND REGULATING A PULSATING PNEUMATIC CONTROL SIGNAL
Donald A. Gallant, 2611 Danbury St., Charlotte, N.C. 28211
Filed Jan. 23, 1967, Ser. No. 611,067
Int. Cl. F15b 5/00; F16k 31/12
U.S. Cl. 137—82                                    16 Claims

ABSTRACT OF THE DISCLOSURE

A device for producing and regulating a pulsating pneumatic control signal for controlling the operation of a responsive apparatus. A pneumatic pulse generating component produces rising pressure pulses received by a pneumatic comparator component and compared thereby with a pilot air pressure indicative of a control condition to provide a control signal responsive to the comparison. The pulses so produced terminate in sharp pressure drops obtained by operation of a vent valve that is opened by displacement of a diaphragm, the displacement being accelerated by exhausing air from one side of the diaphragm in response to initial diaphragm displacement.

BACKGROUND OF THE INVENTION

The present invention pertains to pneumatic controls, and in particular to pneumatic controls for producing pulsating condition responsive control signals for actuation of apparatus such as atomizers, blow valves, steam valves, heaters or other apparatus operable intermittently to produce and maintain a desired condition.

Pneumatic pulse generating devices have been used heretofore to control intermittent operation of apparatus. A pertinent type of this device transforms constant pressure supply air into a pulsating pressure discharge by using a portion of the supply air to develop a pulsating pressure control that manipulates a booster valve for discharge of the supply air in a series of pressure pulses proportional to the pulsating control pressure. In this type of device a toggle mechanism operates when the control air reaches a predetermined pressure to open a valve that vents the control air and thereby cause a pressure drop that terminates each pressure pulse. The pulsating air discharged from the booster valve is fed to individual operating zones for operating atomizers or other pneumatically operated apparatus with a relief valve disposed in the pulsating pressure line to each zone to shut off the operation in the zone when the condition in the zone reaches a selected level.

The purpose of a device of this type is to produce and maintain a desired condition in the zone and effectively vary the period of operation to compensate for variations in the zone condition such that a substantially static condition will persist. This requires precise pulse generation with a sharp pressure cut-off and a precise and rapid response to variations in zone conditions. Prior devices have been generally effective in this regard, but greater precision and sensitivity are desired to obtain closer control of condition variations so that substantially static zone conditions will be maintained.

SUMMARY

The present invention is an improvement in the aforesaid type of device for producing and regulating a pulsating pneumatic control signal whereby a unique valve operating means effects a rapid and positive pulse termination to produce a precise pressure pulse signal and a unique pressure comparator component compares directly the pulse pressure with a control pressure and produces a sensitive response for operation of the zone conditioning apparatus. As a result a highly effective and sensitive device is provided capable of controlling zone conditions precisely and of compensating effectively and rapidly for condition variations such that substantially static zone conditions are maintained.

Briefly described, the device of the present invention includes a pneumatic pulse generating component that receives a continuous supply of air under constant pressure and discharges air in a continuing series of rising pressure pulses, and a pneumatic comparator component and pilot air from a control condition sensing device and compares the pulsating air pressure with the pilot air pressure to provide a control signal responsive to this comparison.

The pulse generating component uses a portion of the supply air at a constant flow rate to provide pulsating pressure control air within an intermittently vented volume chamber and uses this pulsating pressure control air to operate a booster valve for discharge of the main flow of supply air at a pulsating pressure directly proportional to the control air pressure. The volume chamber is intermittently vented to terminate each pulse by means including an operating chamber, chamber exhausting means and operating means. The operating chamber is divided by a diaphragm and is connected to the constant pressure supply air and the pulsating pressure control air on opposite sides of the diaphragm. The chamber exhausting means is responsive to displacement of the diaphragm by an increase in the control air pressure to exhaust the supply air from the operating chamber, thereby accelerating displacement of the diaphragm. The operating means is responsive to the accelerated diaphragm displacement to vent air rapidly from the volume chamber, thereby producing a sharp drop in the control air pressure and related discharge air pressure.

The pneumatic comparator component has a pressure comparison chamber divided by a diaphragm and connected to the pulsating pressure from the pulse generating component and to pilot air from the control condition sensing device on opposite sides of the diaphragm. Means responsive to displacement of the comparison diaphragm by a pressure differential thereacross produces a control signal for actuation of a responsive apparatus.

DESCRIPTION OF THE PREFERRED EMBODIMENT

Figure 1:
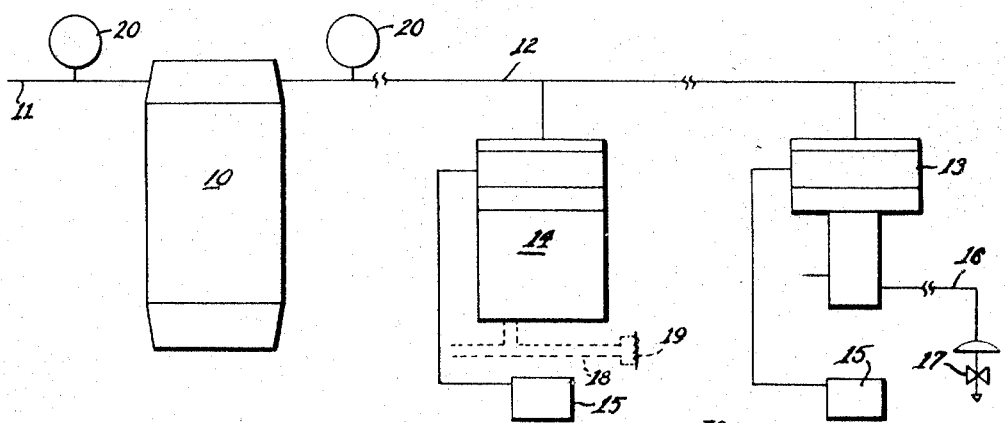
FIG. 1 is a schematic illustration of a device for producing and regulating a pulsating pneumatic control signal according to the preferred embodiment of the present invention.

In the preferred embodiment illustrated in the accompanying drawings, the device for producing and regulating a pulsating pneumatic control signal of the present invention includes a pneumatic pulse generating component 10 that receives a supply of constant pressure air from a conventional source through a supply line 11 and discharges air having a pulsating pressure through a feed line 12 to pneumatic pressure comparator components 13 and 14. In a typical device, there would be a comparator component for each zone for which an independent control signal is desired, and usually all comparator components in a particular installation would be either of the pneumatic signal producing type 13, shown at the right in FIG. 1, or of the electrical signal producing type, shown in the center of FIG. 1. The comparator components 13 and 14 each independently compare the pressure of the air received from the pulse generating component 10 with the pressure of pilot air received from a conventional condition sensing device 15 located in the zone controlled by the particular comparator component. The comparator component 13 at the right in FIG. 1 uses the pressure comparison to produce the pneumatic control signal through the control line 16 to actuate a valve 17 of a responsive apparatus, such as an atomizer. The comparator component 14 in the center of FIG. 1 uses the pressure comparison to produce an electrical control signal in a circuit 18 for actuation of an electrical switch 19 for operation of the responsive apparatus. Pressure gauges 20 are connected to the supply line 11 and to the feed line 12 to provide an indication of the supply air pressure and the pulsating discharge air pressure.

The pulse generating component 10 generally comprises a booster valve section 21 at the top thereof, a flow control section 22 at the bottom, and an intermediate control pulse generating section 23. These sections are formed in a composite body member 24.

A supply port 25 is formed in the booster valve section 21 for connection of the supply line 11 to the pulse generating component 10. This supply port 25 opens into the booster valve chamber 26 for feed of the main flow of supply air thereto. A relatively small diameter branch passage 27 extends from the supply port 25 for handling a small portion of the supply air. This branch passage 27 extends from the booster valve section 21 through the control pulse generating section 23 to the flow control section 22 at the bottom of the generating component 10.

This branch passage 27 opens into a cut-off valve 28 through which the supply air passes into a flow control section chamber 29 from which the air flows through a flow control passage 30 in which an adjustable needle valve restriction 31 is disposed for maintaining a constant pressure difference thereacross, which produces a constant flow rate therebeyond in the connected feed passage 32 that extends upwardly through the control pulse generating section 23 for feeding air from the restriction 31 into a volume chamber 33 through an opening 34 and to an operating chamber 35 through an opening 36. The constant flow rate across the restriction 31 produces a linear pressure rise in the volume chamber 33 and operating chamber 35.

The volume chamber 33 is separated from the aforementioned flow control section chamber 29 by an intermediate diaphragm 37, which has a downward bias applied thereto by a coil spring 38 seated in a well 39 in a cross wall 40 in the volume chamber 33 immediately above the diaphragm 37, which cross wall 40 has a central opening 41 for passage of volume chamber air therethrough to apply the pressure thereof against the top side of the intermediate diaphragm 37. The bias of the spring 38 and the pressure of the air within the volume chamber 33 urge the intermediate diaphragm 37 downwardly for seating of the tip 42 of an elongated valve member 43 in a valve seat 44 attached to the intermediate diaphragm 37 and opening into the interior thereof for communication with the atmosphere through the open interior 45 of the diaphragm, which opens to the atmosphere at the side of the body member 24.

The elongated valve member 43 extends downwardly to form the valve member of the cut-off valve 28. A relatively weak coil spring 46 biases the valve member 43 upwardly in cut-off valve closing position, but is insufficient to overcome the normal downward biasing of the valve member by the forces acting through the diaphragm 37. Thus, the cut-off valve 28 is normally open to allow supply air to pass therethrough to the adjustable restriction 31 and therebeyond to the volume chamber 33 and operating chamber 35. However, whenever the air pressure within the flow control section chamber 29 becomes greater than the combined pressure of the coil spring 46 and volume chamber air, the diaphragm 37 will be displaced upwardly, effecting a closure of the cut-off valve 28 by the valve member 43 and unseating the valve member tip 42 from the diaphragm carried valve seat 44 such that the air pressure within the flow control section chamber 28 will be blown off through the open interior 45 of the diaphragm to the atmosphere. As this blowoff reduces the pressure within the flow control section chamber 29, the diaphragm will move downwardly to interrupt the blowoff and open the cut-off valve 28 for resumption of supply air to the flow control section chamber 29 and continued operation of the flow control section 22.

As the volume chamber 33 receives the air passing past the constant flow restriction 31 there will be a linear increase in the air pressure within the volume chamber and, therefore, in the connected operating chamber 35. This air pressure is intermittently reduced by venting air from the volume chamber 33 through a vent port 47 that is normally closed by a vent valve member 48 held in closed position by a coil spring 49 biased between the volume chamber cross wall 40 and the closure flange 50 of the vent valve member 48. A stem 51 extends from the vent valve member 48 through the vent port 47 and upwardly therefrom for engagement and manipulation to open the vent port 47 exteriorly of the volume chamber 33.

Operation of the vent valve member 48 is accomplished by using the air pressure within the aforementioned operating chamber 35, which is divided by a diaphragm 52. The aforementioned opening 36 through which the control air passes into the operating chamber 35 is located above the diaphragm 52 so that the control air pressure will act downwardly on the diaphragm 52. Upward pressure against the underside of the diaphragm 52 is applied by the constant pressure supply air, which passes to the operating chamber 35 through a lateral passage 53 opening into the bottom of the operating chamber 35 and connected to the supply air branch passage 27 by means of a plug 54 that has a bore 55 communicating between the branch passage 27 and lateral passage 53. This bore 55 is of a substantially restricted diameter so that the rate of flow of supply air to the operating chamber 35 will be less than the rate of exhaustion that is accomplished in the manner described hereinbelow.

Exhaustion of the supply air side of the operating chamber 35 is accomplished intermittently through a central exhaust port 56 in the bottom of the chamber. This port 56 is normally closed by a valve member 57 that extends into the operating chamber 35 and is connected to the diaphragm 52 so that when the diaphragm is in its normal position the valve member 57 will be in closing disposition in the exhaust port 56 and a flange 58 on the valve member 57 will be held in sealing disposition around the exhaust port 56 exteriorly of the bottom of the operating chamber 35. The exhaust port 56 and valve member 57 are both tapered outwardly and downwardly so that downward movement of the valve member will open the port widely for exhaustion of the supply air from the operating chamber 35.

The valve member 57 extends downwardly beyond the flange 58 for threaded attachment of an adjustable extension cap 59. The position of this cap 59 is adjusted so that when the valve member 57 is in closed position there will be a slight spacing between the cap 59 and the vent valve member 48 at the volume chamber, with which vent valve member 48 the exhaust valve member 57 is aligned so that valve opening reciprocation of the exhaust valve member 57 will effect vent port opening and closing reciprocation of the vent valve member 48 with a slight lost motion resulting from the spacing between the extension cap 59 and the vent valve member stem 51.

Valve operating reciprocation of the exhaust valve member 57 is obtained by displacement of the diaphragm 52 by an increase in the control air pressure acting on the top of the diaphragm. The effective surface areas of the top and bottom of the diaphragm 52 are related so that a control air pressure of a few p.s.i. less than the supply air pressure will cause an initial downward displacement of the diaphragm, which causes the exhaust valve member 57 to move downwardly, opening the exhaust port 56 for exhaustion of supply air from the operating chamber 35, which sharply drops the supply air pressure and, thereby, accelerates displacement of the diaphragm 52. This accelerates the downward movement of the exhaust valve member 57 so that it has substantial impetus when it strikes the vent valve member stem 51 for rapid opening of the vent port 47 to produce a sharp drop in the control air pressure. For this purpose the vent 47 is significantly larger than the vent valve member stem 51 so that the vent port 47 will be opened widely and the control air will discharge rapidly therethrough to the atmosphere chamber 60 that opens at 61 to the atmosphere through the side of the body member 24. The operating chamber exhaust port 56 also opens into this atmosphere chamber 60.

Return of the diaphragm 52 for closure of the volume chamber vent port 47 and operating chamber exhaust port 56 is produced by the combination of the drop in control air pressure above the diaphragm 52 because of the volume chamber venting, a build-up of supply air pressure under the diaphragm, and the biasing of the volume chamber vent valve member closing spring 49. The build-up of supply air pressure in the operating chamber 35 is accomplished by closure of the exhaust port 56 when the diaphragm 52 is fully displaced downwardly. For this purpose, a closure plate 62 is attached to the exhaust valve member 57 at the under surface of the diaphragm. This closure plate 62 is of a diameter greater than the diameter of the exhaust port 56 so that when the diaphragm 52 is displaced downwardly the closure plate 62 will seat against the bottom of the operating chamber and seal the exhaust port 56 so that supply air exhaustion will cease at the full downward displacement of the diaphragm 52 and the pressure of the supply air will return to normal and urge the diaphragm 52 upwardly. The diaphragm return action of the vent valve coil spring 49 acts only during initial return displacement until the vent valve member 48 closes the vent port 47 and the exhaust valve member 57 moves upwardly away from the vent valve member stem 51. The spacing between the elements relieves the diaphragm of the bias of the vent valve spring 49 during normal inoperative positioning of the elements and is not active until accelerated diaphragm displacement has begun, with the force of the accelerated displacement being sufficient to overcome the spring bias.

The foregoing unique valve operating arrangement results in a sharp blowoff of the control air pressure as well as a quick resumption of the pressure development such that a pressure curve representing the control air pressure would have a sharp saw-tooth configuration.

The control air pressure is used to operate the booster valve section 21 to discharge the main flow of supply air at the same pulsating pressure as the control air. For this purpose, the operating chamber 35 opens into the bottom of a booster valve section discharge chamber 63 that is divided by a diaphragm 64 that seals the control air in the space below the diaphragm and transmits the control air pressure to the air above the diaphragm. This discharge chamber diaphragm 64 carries a valve seat 65 that is engageable with the tapered lower tip 66 of an extension of a booster valve member 67 that extends upwardly through a booster valve port 68. The valve member 67 has an upwardly and outwardly tapered valve closing portion 69 that seats in the booster valve port 68 to close the port.

The length of the booster valve member 67 is sufficient to seat the tip 66 thereof in the diaphragm valve seat 65 when the control air is under pressure, and as the pressure increases from an initial minimum the diphragm is displaced upwardly, lifting the booster valve member 67 to allow supply air to flow through the booster valve port 68 for pressure build-up of the discharge air, with the discharge chamber diaphragm serving to regulate the discharge pressure for pressure rise at the same rate as the pressure rise of the control air in the discharge chamber below the diaphragm 64.

When the control air pressure drops, causing return of the diaphragm 64 downwardly to its lowermost position, the valve member 67 will close the booster valve port 68 and the diaphragm valve seat 65 will move downwardly away from the booster valve member tip 66 to allow discharge air to vent through the diaphragm interior to the atmosphere at a side opening 70 in the body member 24 so that the pressure of the discharge air will drop in the same pattern as the control air pressure. The booster valve member 67 is biased downwardly in closing relation to the booster valve port 68, or against the diaphragm valve seat 65 when the diaphragm 64 is displaced upwardly, by a small coil spring 71 biased between the top of the booster valve chamber 26 and the valve closing portion 69 of the booster valve member 67.

Air is discharged from the chamber 63 of the booster valve section 21 through a discharge port 72 to which is connected the feed line 12 running to the pressure comparator components 13 and 14 for transmission of the continuing series of pressure pulses thereto.

Figure 3:
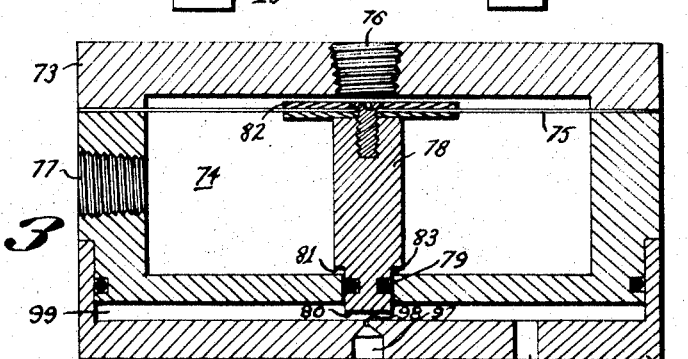
FIG. 3 is a vertical sectional view of the pneumatic comparator component shown at the right in FIG. 1 with the elements in their inoperative positions.
Figure 4:
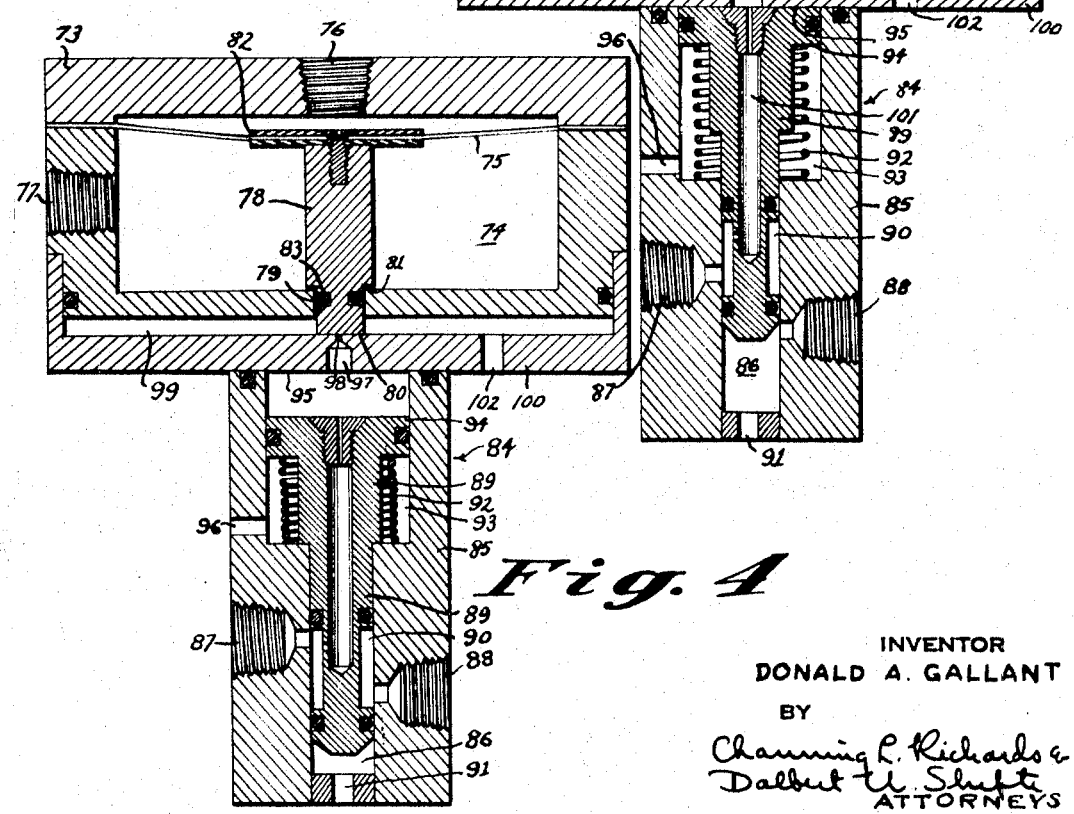
FIG. 4 is a view similar to FIG. 3 with the elements in their operative positions.
Figure 2:
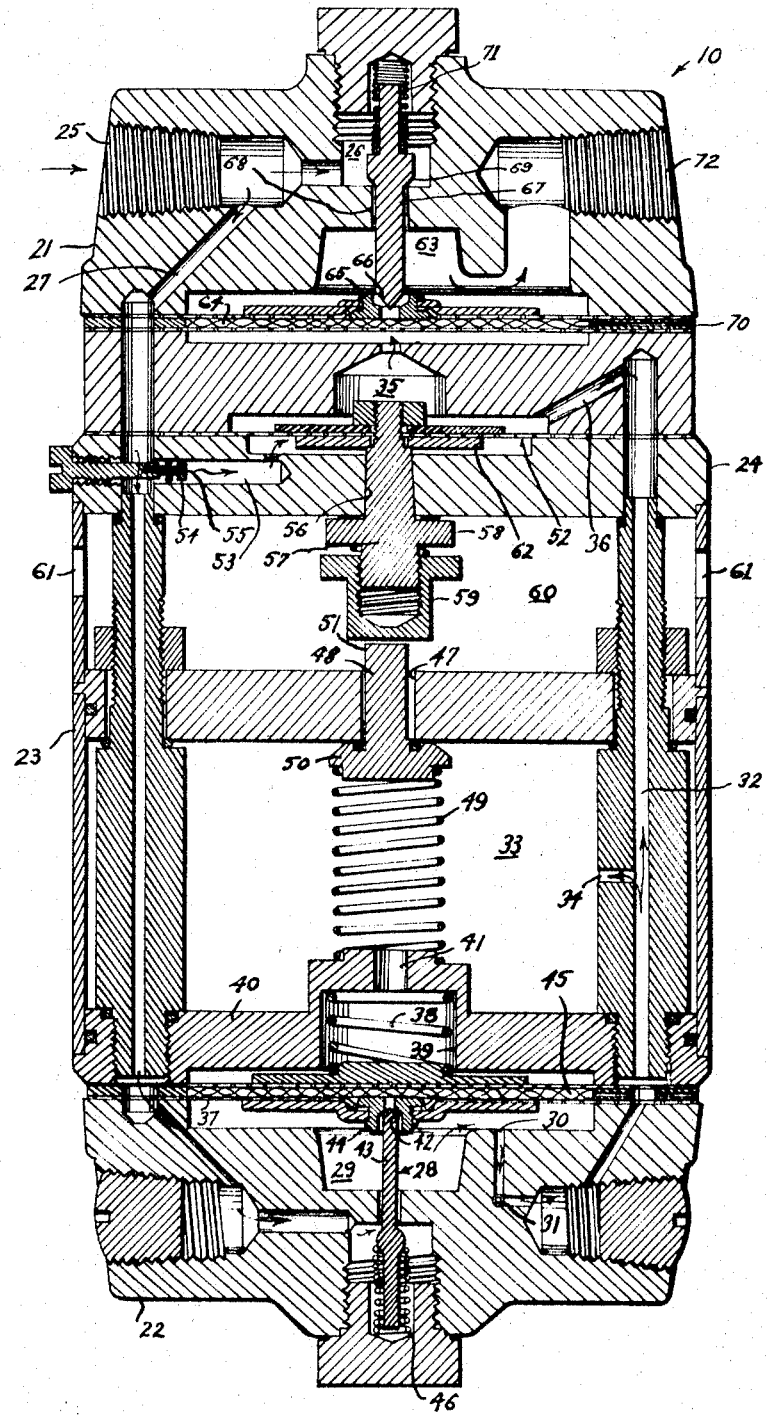
FIG. 2 is a vertical sectional view of the pneumatic pulse generating component of the device of FIG. 1.

The pneumatic signal producing comparator component 13, illustrated in FIGS. 3 and 4, has a body member 73 in which is formed a pressure comparison chamber 74 that is divided by a diaphragm 75. The pulsating pressure feed line 12 is connected to a top port 76 of the body member 73 for introduction of pulsating pressure air from the generating component 10 into the chamber 74 above the diaphragm 75. The control line from the condition sensing device 15 is connected to the body member 73 at a side port 77 for introduction of the pilot air into the chamber 74 below the diaphragm 75. Thus the diaphragm 75 is responsive to changes in the pressure differential between the pulsating air received from the generating component 10 and the condition indicating pilot air received from the condition sensing device 15.

Downward displacement of the diaphragm 75 is transmitted exteriorly of the chamber 74 by an operating member 78 that is attached to the diaphragm 75 centrally thereof for movement therewith and extends downwardly through an opening 79 to a flat outer end 80. The operating member 78 is shouldered interiorly at 81 for engagement with the chamber bottom to stop downward movement of the operating member 78, and upward movement of the operating member 78 is limited by engagement of a top plate 82 that is secured to the diaphragm 75 with the top wall of the chamber 74. The diaphragm 75 is located closely adjacent the top of the chamber 74 so that only slight upward displacement of the diaphragm from a neutral position is possible. This prevents the operating member end 80 from being drawn completely into the chamber 74 and breaking the seal that is provided at the opening 79 by an annular O-ring that is seated on the operating member 78 within the opening 79.

During a portion of each pressure pulse when the pulse pressure imposes a downward imbalance on the diaphragm 75 in relation to the pilot air the operating member 78 will be displaced downwardly in an operative position with relation to pneumatic valve means 84 that is connected through the control line 16 to actuate a responsive apparatus such as the valve 17 of an atomizer.

The valve means comprises a housing 85 that is attached to the body member 73 and has a valve chamber 86 for connecting an intake port 87 with a discharge port 88 in the control line 16 on opposite sides of the valve chamber 86, with the discharge port 88 being located below the level of the intake port 87.

A valve member 89 is disposed in the valve chamber 86 for vertical reciprocation in line with the operating member 78. The valve member 89 is formed with an annular recess 90 of sufficient vertical extent to remain aligned with the intake port 87 in any position of the valve member 89, but being spaced from the discharge port 88 when the valve member 89 is in a raised inoperative position, in which the valve member 89 itself is above the discharge port 88 so that the port will open to the atmosphere through a vent 91 in the housing 85 at the bottom of the valve chamber 86.

The valve member 89 is normally biased in an inoperative raised position by a coil spring 92 that is biased between a bottom shoulder 93 in the valve chamber 86 and an annular flange 94 at the top of the valve member 89. In this inoperative position the top surface of the valve member flange 94 abuts a top wall 95 of the valve chamber 86. The valve chamber 86 vents through an opening 96 adjacent the bottom shoulder 93 to eliminate any pressure resistance to reciprocation of the valve member 89.

The valve chamber 86 has an actuating chamber portion 97 extending centrally above the top wall 95 thereof and at which the center portion of the surface of the valve member flange 94 is exposed upwardly. The actuating chamber portion 97 terminates upwardly in a bleed port 98 opening into an atmosphere chamber 99 that has a flat bottom wall 100 against which the flat end of the operating member will seat in bleed port covering relation when the operating member 78 is in its lowermost operative position. Air is delivered to the actuating chamber portion 97 through a branch passage 101 formed centrally in the valve member 89 and communicating with the annular recess 90 for delivery of air from the control line 16 through the intake port 87 to the actuating chamber portion 97.

When the operating member 78 is in a raised inoperative position, the bleed port 98 is uncovered and the air in the actuating chamber portion 97 escapes therethrough into the atmosphere chamber 99 and through a vent port 102 therein to the atmosphere. During this condition the valve member 89 is retained in its raised inoperative position by the spring 92.

When the operating member 78 is moved downwardly by displacement of the diaphragm 75 into its operative position in closing relation over the bleed port 98, the control line air delivered to the actuated chamber portion 97 builds up pressure, which acts against the exposed surface of the valve member flange 94 to move the valve member downwardly against the bias of the spring 92.

Upon initial movement of the valve member 89 downwardly, the flange 94 will move away from the valve chamber top wall 95 and the entire top surface of the flange will be exposed to the pressure of the actuating chamber portion air, thereby accelerating downward movement of the valve member 89 to its lower operative position in which the annular recess 90 is aligned with both the intake port 87 and discharge port 88 for opening of the control line 16.

At the end of each pressure pulse received by the comparator component 13, the pressure drop will cause the diaphragm 75 to return upwardly, thereby moving the operating member 78 upwardly to its inoperative position. This will open the bleed port 98 so that air can escape from the actuating chamber portion 97, thereby eliminating the downward pressure on the valve member 89 so that the spring 92 will return the valve member to its inoperative position. The inoperative position of the elements of the comparator component 13 is illustrated in FIG. 3, and the operative position of the elements is shown in FIG. 4.

Figure 5:
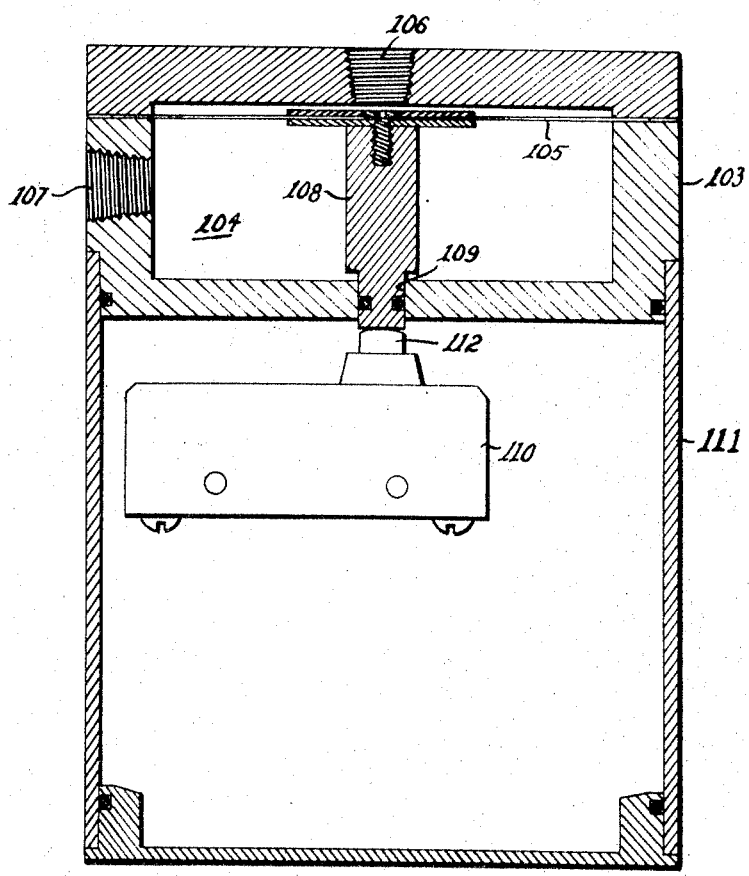
FIG. 5 is a vertical sectional view of the pneumatic comparator component shown in the center of FIG. 1 with the elements in their inoperative positions.

The electrical control producing comparator component 14 is seen in FIG. 5 to include a body member 103, pressure comparing chamber 104, diaphragm 105, top port 106, side port 107, operating member 108 and body member opening 109 identical to the corresponding elements of the pneumatic control producing comparator component 13 described hereinabove. However, in place of the pneumatic valve means 84, an electrical switch unit 110 is mounted in a housing 111 secured to the body member 103 and extends therebelow to position the operating finger 112 in vertical alignment with the operating member 108 for actuation thereby when the operating member is moved by displacement of the diaphragm 105 into its operative position. FIG. 5 shows the elements in their inoperative position. In the operative position the diaphragm 105 is displaced downwardly so that the operating member 108 depresses the switch finger 112. This closes the switch unit 110 and energizes the electrical circuit 18 for actuation of a responsive apparatus, such as an atomizer valve.

In a typical operation, the device of the present invention is arranged for the control of a system of atomizers regulated by the present device to produce a desired humidity condition. In this operation a single pulse generating component 10 is located conveniently and connected to a supply line 11 from a source of air under pressure of, for example, 25 p.s.i. The feed line 12 connects the pulse generating component 10 to a desired number of comparator components of either the pneumatic signal producing type 13 or the electrical signal producing type 14, with each comparator component being in control of one or more atomizers in a conditioning zone. A condition sensing device, such as humidostat, is located in each zone to feed a pilot air pressure to its associated comparator component.

When the operation is begun the supply air feeds into the pulse generating component with the booster valve port 68 closed by the valve member 67 so that there is no air pressure downstream of the pulse generating component 10. The adjustable restriction 31 in the flow control section 22 is set to provide a desired pulse period, which may be varied between a few seconds and several minutes. The supply air flows through the flow control section 22 into the volume chamber 33 and as the flow continues the pressure increases in the substantially constant volume pulse generating section 23. As the pressure rises, it causes displacement of the discharge chamber diaphragm 64 to engage and raise the booster valve member 67 and open the booster valve port 68 so that the supply air will pass through the discharge port 72 and through the feed line 12 to the comparator components 13 and 14. As the system is substantially constant volume downstream from the pulse generating component 10, the flow of discharge air creates a linear rise in the downstream pressure. When the control air pressure within the pulse generating component 10 reaches about 3 p.s.i. less than the supply air pressure the operating chamber diaphragm 52 will be displaced downwardly, thereby opening the exhaust port 56 at the bottom of the operating chamber 35 to exhaust the supply air therefrom and accelerate downward movement of the valve member 57 so that when it strikes the vent valve member stem 51 it will open the volume chamber vent port 47 with a snap action and precisely at the desired pressure without any leakage as the pressure approaches the operating pressure. Exhausting the volume chamber 33 reduces the pressure in the discharge chamber 64 below the diaphragm 64 to effect lowering of the booster valve member 67 and closing of the booster valve port 68. This downward diaphragm movement also spaces the valve seat 65 from the lower tip 66 of the booster valve member 67 so that air will be vented through the diaphragm 64 to the atmosphere, thereby reducing the downstream pressure substantially to atmospheric pressure.

Exhaustion of the volume chamber reduces the pressure acting on the operating chamber diaphragm 52, which, in combination with the supply air acting on the bottom of the diaphragm 52 and the bias of the vent valve spring 49, cause the diaphragm 52 to return to its normal position, thereby closing the operating chamber exhaust port 56 and the volume chamber vent port 47 for a resumption of the pressure cycle.

The pulsating pressure from the pulse generating component 10 is applied to the top of the comparator component diaphragms 75 and 105 and when the pressure of each pulse overcomes the upward force of the pilot air pressure underneath the diaphragms, downward displacement will occur to move the operating members 78 and 108 downwardly to actuate either the pneumatic valve means 84 of FIG. 3 or the electrical switch unit 110 of FIG. 5 as described hereinabove.

The above-described operation is an accurate time-proportioned control that provides an on-off time ratio operation precisely responsive to variations in zone conditions to compensate therefor and provide substantially static conditions.

I claim:

1. A device for producing and regulating a pulsating pneumatic control signal for actuation of a responsive apparatus, said device comprising a pneumatic pulse generating component for receiving a continuous supply of air under constant pressure and discharging said air in a continuing series of rising pressure pulses and a pneumatic comparator component for receiving the pulsating air from said pulse generating component and pilot air from a device that provides a pilot air pressure in relation to a control condition, said comparator component comparing the pressure of said pulsating air and said pilot air and providing a control signal responsive to said comparison, said pulse generating component utilizing a portion of the supply air at a constant flow rate to provide pulsating pressure control air within an intermittently vented volume chamber and utilizing the pulsating pressure control air to operate a booster valve for discharge of the main flow of supply air at a pulsating pressure directly proportional to the control air pressure, means in said pulse generating component for intermittently venting air from said volume chamber and including an operating chamber, chamber exhausting means and operating means, said operating chamber being divided by a diaphragm and connected to the constant pressure supply air and to the pulsating pressure control air on opposite sides of said diaphragm, said chamber exhausting means being responsive to displacement of said diaphragm by an increase in the control air pressure to exhaust the supply air from the operating chamber and thereby accelerate displacement of said diaphragm, said operating means being responsive to said accelerated diaphragm displacement to vent air rapidly from the volume chamber and thereby produce a sharp drop in the control air pressure and in the pressure of the air delivered to the pneumatic comparator component, said pneumatic comparator component including a pressure comparison chamber divided by a diaphragm and connected to the pulsating pressure air received from the pulse generating component and to pilot air received from said control condition sensing device on opposite sides of said comparison chamber diaphragm, and means responsive to displacement of said comparison chamber diaphragm by the pressure differential thereacross to produce a control signal for actuation of the responsive apparatus.

2. In a pneumatic pulse generating device of the type that receives a continuous supply of air under constant pressure and discharges said air in a continuing series of rising pressure pulses by utilizing a portion of the supply air at a constant flow rate to provide pulsating pressure control air within an intermittently vented volume chamber and utilizing the pulsating pressure control air to operate a booster valve for discharge of the main flow of supply air at a pulsating pressure directly proportional to the control air pressure, the improvement in means for intermittently venting air from said volume chamber comprising an operating chamber divided by a diaphragm and connected to the constant pressure supply air and to the pulsating pressure control air on opposite sides of said diaphragm, chamber exhausting means responsive to displacement of said diaphragm by an increase in the control air pressure to exhaust the supply air from said operating chamber and thereby accelerate displacement of said diaphragm, and operating means responsive to said accelerated diaphragm displacement to vent air rapidly from the volume chamber and thereby produce a sharp drop in the control air pressure and in the main flow discharge air pressure.

3. The improvement in means for intermittently venting air from a volume chamber in a pneumatic pulse generator according to claim 2 and characterized further in that the effective surface of the supply air side of the diaphragm is smaller than the effective surface of the opposing control air side thereof for operating displacement of said diaphragm at a control air pressure less than the supply air pressure.

4. The improvement in means for intermittently venting air from a volume chamber in a pneumatic pulse generator according to claim 3 and characterized further in that said chamber exhausting means has means for terminating said supply air exhausting in response to further displacement of said diaphragm to permit the supply air pressure within said operating chamber to return to said constant supply air pressure and effect return of said diaphragm.

5. The improvement in means for intermittently venting air from a volume chamber in a pneumatic pulse generator according to claim 4 and characterized further in that said chamber exhausting means comprises an exhaust port in the supply air side of said operating chamber, a valve member normally closing said exhaust port and operated by said diaphragm to open said port upon diaphragm displacement, and said means for terminating said supply air exhausting comprises an exhaust port closing member carried by said valve member for movement therewith from a spacing from said port into port closing disposition upon full diaphragm displacement.

6. The improvement in means for intermittently venting air from a volume chamber in a pneumatic pulse generator according to claim 5 and characterized further in that said exhaust valve member is reciprocated by said diaphragm, and said operating means comprises a vent port in said volume chamber and a vent valve member normally closing said vent port and aligned with the reciprocation of said exhaust valve member for engagement thereby to open said vent port upon diaphragm displacement, said valve members being normally spaced to permit initial acceleration of said exhaust valve member prior to vent valve member engagement.

7. The improvement in means for intermittently venting air from a volume chamber in a pneumatic pulse generator according to claim 6 and characterized further by means normally biasing said vent valve member in vent port closing position and acting through said valve members to impart a return bias on said diaphragm.

8. Pneumatically operated actuating means comprising a body member, an operating chamber in said body member divided by a diaphragm and connected to a supply of air under constant pressure and to pulsating pressure control air on opposite sides of said diaphragm, chamber exhausting means responsive to displacement of said diaphragm by an increase in control air pressure to exhaust the supply air from said operating chamber and thereby accelerate displacement of said diaphragm, and operating means responsive to said accelerated diaphragm displacement to provide an impulse for actuation of an associated device.

9. Pneumatically operated actuating means according to claim 8 and characterized further in that said chamber exhausting means comprises an exhaust port in the supply air side of said operating chamber, and a valve member normally closing said exhaust port and operated by said diaphragm to open said port upon diaphragm displacement, and said operating means comprises an extension of said valve member exteriorly of said operating chamber.

10. Pneumatically operated actuating means according to claim 9 and characterized further by a supply air intake passage in said body member opening into the supply air side of said operating chamber for delivery of supply air thereto, said supply air intake having a smaller cross-sectional area than that of the opening provided in said exhaust port by said valve member thereby permitting substantial exhaustion of supply air from said port upon valve member operation.

11. Pneumatically operated actuating means according to claim 9 and characterized further by a port closing member carried by said valve member for movement therewith from a spacing within said operating chamber from said port into port closing disposition upon full diaphragm displacement.

12. Pneumatically operated actuating means according to claim 9 and characterized further in that said valve member extension is normally spaced from the associated device to permit initial acceleration of said valve member prior to actuation engagement of said device.

13. Pneumatically operated actuating means according to claim 12 and characterized further by means for biasing said valve member toward its normal port closing position, said biasing means inactive prior to actuation engagement of the associated device by said valve member extension.

14. Pneumatically operated actuating means comprising an operating member, means for reciprocating said operating member in response to control signals, and pneumatic valve means controlled by said operating member for pneumatic operation of an associated apparatus, said pneumatic valve means comprising a valve housing having a valve chamber therein and opposed intake and discharge ports opening into said valve chamber, a valve member slidably disposed in said valve chamber and forming a valve passage therein for connecting said ports, means for normally biasing said valve member in a closed position at which said valve passage is spaced from said discharge port, said valve chamber having a valve actuating portion at which a surface of said valve member is exposed for opening actuation thereof by air pressure in said valve actuating portion, means for delivering air from a supply of air under pressure to said actuating chamber portion, said valve housing having a bleed port at said valve actuating chamber portion for bleeding air therefrom to the atmosphere, said bleed port being aligned with said operating member for closure of said bleed port thereby upon said diaphragm displacement for air pressure build-up in said valve actuating chamber portion to slide said valve member to open position during bleed port closure by said operating member.

15. Pneumatically operated actuating means according to claim 14 and characterized further in that said means for delivering air from a supply of air under pressure comprises a branch passage extending through said valve member between said intake port and said valve actuating chamber portion for delivery of supply air from said intake port to said chamber portion.

16. Pneumatically operated actuating means according to claim 14 and characterized further in that said valve chamber is formed with a shoulder adjacent said valve actuating chamber portion for abutment of the closed valve member thereagainst whereby upon initial movement of said valve member by the air pressure in the valve actuating chamber portion a substantially additional surface of the valve member is exposed to the actuating air pressure for accelerated movement of the valve member to open position.

References Cited
UNITED STATES PATENTS

| | | | |
|---|---|---|---|
| 3,213,613 | 10/1965 | Schwent et al. | 137—82 XR |
| 3,381,697 | 5/1968 | Wellford | 137—82 |

DONALD E. WATKINS, Primary Examiner

U.S. Cl. X.R.

137—624

UNITED STATES PATENT OFFICE
CERTIFICATE OF CORRECTION

Patent No. 3,460,557 August 12, 1969

Donald A. Gallant

It is certified that error appears in the above identified patent and that said Letters Patent are hereby corrected as shown below:

Column 2, line 11, after "component" insert -- that receiv the pulsating air from the pulse generating component --. Colu 11, line 31, after "means" insert -- being --. Column 12, afte line 36, insert

| | | | |
|---|---|---|---|
| 2,858,840 | 11/1958 | Wright --------- | 137-82 |
| 2,935,972 | 5/1960 | Segerstad ------ | 137-82 XR |
| 3,083,721 | 4/1963 | Mathews et al. - | 137-624.14 XR |
| 3,216,325 | 11/1965 | Couffer et al. - | 137-624.14 XR |
| 3,253,610 | 5/1966 | Pahl et al. ---- | 251-61 XR |
| 3,319,644 | 5/1967 | Thornburn ------ | 137-624.14 XR |

Signed and sealed this 3rd day of March 1970.

(SEAL)
Attest:

EDWARD M. FLETCHER, JR.
Attesting Officer

WILLIAM E. SCHUYLER, JR
Commissioner of Patents